United States Patent Office 3,505,396
Patented Apr. 7, 1970

3,505,396
SULFOPROPYLATED AMPHOTERIC COMPOUNDS AND METHOD FOR MAKING SAME
Herbert L. Sanders, Skokie, Ill., and John B. Braunwarth, Janesville, Wis., assignors to Varney Chemical Division of Northern Petrochemical Company, Omaha, Nebr., a corporation of Delaware
No Drawing. Filed Oct. 2, 1967, Ser. No. 671,997
Int. Cl. C07c *143/14*; A61k *27/00*
U.S. Cl. 260—513
9 Claims

ABSTRACT OF THE DISCLOSURE

Sulfopropylated amphoteric surfactants soluble in concentrated electrolyte solutions and stable in alkaline systems, and having the ability to serve as thickeners for aqueous solutions, the preparations comprising reaction products of alkoxylated tertiary amines with sultone reagents. Methods of making these products.

---

This invention relates to novel and unique amphoteric surface active compositions and to methods for their preparation. More particularly, the invention concerns sulfopropylated and homologous amphoteric products formed by a process involving the interaction of alkoxylated tertiary amines with sultone reagents.

In accordance with the present invention, the surprising and unexpected discovery has been made that a well-defined new group of amphoteric compounds, i.e. chemical agents containing both cationic and anionic groups in a single molecule, exhibits a high degree of solubility and remarkable utility as surface active agents in concentrated electrolyte solutions. These compounds also show unusual chemical stability under prolonged contact with alkaline systems. In addition, particular members of this class of chemicals are effective as solution thickening agents. This ability to "thicken" water and aqueous solutions, at rather low concentrations, in an unusual and valuable property, similar to that shown by the alkanolamides.

Throughout the specification the invention is described with reference to the sulfopropylated product, not by way of limitation, but because propane sultone is readily commercially available. It will be evident, however, that homologues of the propane sultone may also be used. The sulfopropylated amphoterics may be represented by the formula $$R-N\begin{matrix}(CH_2-CH_2O)xH \\ (CH_2-CH_2O)y(CH_2)p-SO_2Z\end{matrix}$$

where R is an alkyl group of from $C_6$ to $C_{20}$, and preferably from $C_8$ to $C_{18}$. R may also be a mixture of alkyl groups such as is found in commercial primary alkyl amines including soya amine, coco amine, tallow amine, and others. The subscripts $x$ and $y$ can be 1 through 7, although compounds in which each of $x$ and $y$ is 1 are preferred. $p$ may be equal to or greater than 3; in preferred compounds $p$ is 3. Z may be hydrogen; alkali metal ions such as potassium, sodium, ammonium; and alkaline earth metal ions which produce soluble products. Product activity and properties are considered to be correlated with the structure of the anion rather than with the identity of the cation.

The products of the invention are conveniently prepared by reacting appropriate proportions of alkoxylated amines with sultone reagents the latter being present in a slight molar excess of from about 5 to 10 percent. The alkoxylated amine starting material, prepared by ethoxylating primary amines, have the structure $$R-N=[(CH_2-CH_2O)_nH]_2$$

where R is an alkyl group as described above and $n$ is a positive integer from 1 to 7, compounds with $n=1$ being preferred.

The sultone reagent in these reactions may be represented by the formula

where p is a positive integer of at least 3. The sultone in which $p$ equals 3, and known as propane sultone, is a preferred reactant being readily available in commercial supply. Propane sultone is also known in the literature as 3-hydroxy-1-propane sulfonic acid sultone, 1-propane sulfonic acid, or 3-hydroxy sultone.

The prior art described in the chemical literature is replete with many and varied types of amine sulfonates, sulfates and related compounds. For example, hydroxyethyl and dihydroxy propyl drivatives of high fatty acid amines have been sulfated with chlorsulfonic acid and give sulfates having the structures $$R-N=[CH_2-CH_2O)_nCH_2-CH_2-OSO_3H]_2$$

and

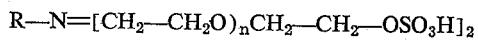

Sulfonated amphoterics represented by the formulas

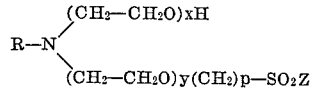 (alkyl taurines) and 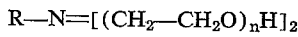

(alkyl benzyl taurines) are also known.

Other related compounds include aromatic sulfonates such as

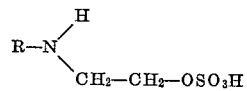

sulfonated and sulfated imidazolines of the following structures

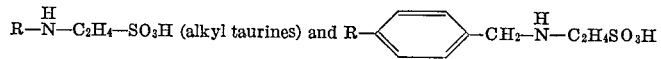

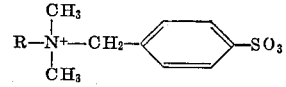

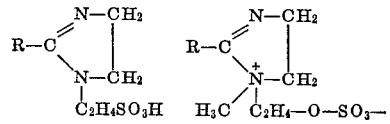

sulfonated benzimidazoles

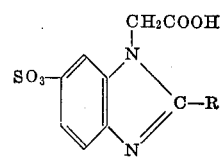

and sultaines

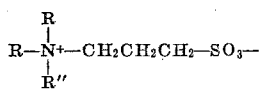

However, none of these compounds has achieved significant commercial acceptance and in none are found all of the desirable properties of the compositions of the instant invention.

The present invention represents, in part, the unexpected and surprising discovery that in the class of compounds involved, the sultone does not add in the usual, predicted manner. This is, whereas the recorded literature J. Williams, bull. Soc. Chem. Belg. 64, 747 (1955), C.A. 50, 16669 (1956);

Bohme Feltchemie GmbH, Brit. Pat. 746,340 (1956) and 764,613 (1956), C.A. 51, 12956 (1957);

Shell Chemical Propane Sultone Technical Information, PD-145, p. 4.

indicates that with compounds containing both amine and hydroxyl groups, propane sultone adds preferentially on the amino nitrogen, in perfecting the present invention it has been discovered that in the case of a primary amine which has been ethoxylated to a tertiary amine, and thus has two hydroxyl groups, a single mole of propane sultone adds to one of the hydroxyl atoms rather than to the nitrogen atom. This fact has been verified by hydroxyl number determinations.

A characterization study of the amphoterics of the invention to ascertain to which of the N or the OH the sultone attaches was conducted on the soya derived product and it was found that a 100% solids the material had a hydroxyl number of 124. The calculated hydroxyl number for a compound having the structure

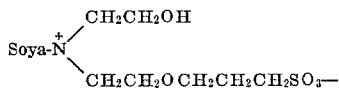

with one free hydroxy group is 116. In a further experiment in which two moles of propane sultone were added to the alkoxylated amine a hydroxyl number of 67 was obtained rather than zero.

Since the hydroxyl number for a compound having the structure

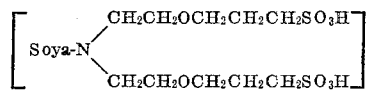

would be zero, it appears that of the two possible reactions when a 1:1 mole ratio of amine to sultone is used

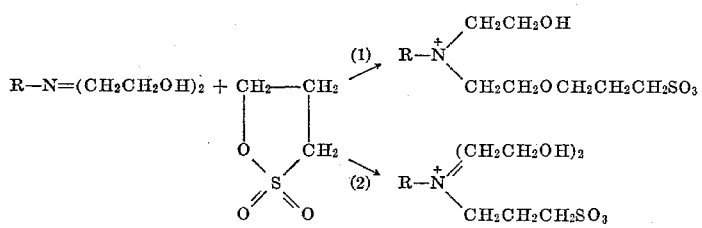

reaction (1) represents the major reaction path, addition of propane sultone at the nitrogen atom to form a quaternary amine occurring to only a minor degree. If, however, two moles of propane sultone are reacted with one mole of the amine, the second mole of the propane sultone appears to react equally with the amine nitrogen and the second hydroxyl group.

Other prior art

J. H. Helberger et al., Ann. 586, 147 (1954), C.A. 49, 6083 (1955);

Ger. Pat. 930,687 (1956), C.A. 50, 10129 (1956);

Ger. Pat. 941,977 (1956), C.A. 53, 1145 (1959);

Ger. Pat. 743,570 (1954), C.A. 48, 12432 (1954);

F. Furukawa et al., Kogyo Kayaka Zaschi, 59, 221 (1956), C.A. 51, 10362 (1957).

suggests that in order to effect propane sultone addition to hydroxyl groups alkaline catalysts are preferred and that, alternatively, the hydroxyl-containing compound is to be treated with metallic sodium to form a sodium alcoholate intermediate. In contrast with these teachings it has been found that in accordance with the procedures of the present invention and using the selected ethoxylated amines, excellent product yields are obtained without a catalyst.

Still another important difference between literature reported reactions and procedures and those of the present invention is that the prior art teaches that for sultone addition reactions a temperature range of from 100° to 140° C. is preferred. In the practice of the present invention it has been established that the ethoxylated amines react effectively at much lower temperatures—in the range of from about 40° to about 100° C. In some instances complete reaction is not achieved until a temperature of 100° C. is reached.

In accordance with a preferred procedure of the present invention, upon adding a select solvent, for example, isopropanol in low concentration, complete reaction is realized at a temperature of only about 70° to 80° C. This predilution technique is useful particularly in the preparation of propane sultone adducts which are stiff and taffy-like and which, therefore, cannot be effectively agitated.

In still another preferred procedural technique of the present invention, the ethoxylated fatty amine and propane sultone are mixed together and heated to about 70° to 80° C. In contrast with the procedure previously described and in which cooling was required, in the instant case the reaction was allowed to exotherm, and temperatures of as high as 180° C. have been reached. It was found that at elevated temperatures of from about 120° C. and up, the reaction system remains stirrable. Upon completion of the reaction, a high boiling solvent such as dipropylene glycol was added, and through the use of as little as 15 to 20% of this solvent, the product remained fluid even after cooling to room temperature. When the reaction mixture had cooled below 100° C. water or other solvents were added to reduce the concentration of the sulfopropylated amphoteric to from about 30% to 60%, this being the preferred use concentration range.

One remarkable and valuable property of the novel sulfopropylated amphoterics of the invention is their unusual solubility in concentrated electrolyte solutions. For example, 5% of any of the coco, tallow or soya derived products dissolves readily in the following systems in which most other types of surfactants salt out.

| | Percent |
|---|---|
| Sulfuric acid | 100 |
| Sodium hydroxide | 30 |
| Potassium hydroxide | 40 |
| Sodium chloride | 20 |
| Sodium metasilicate | 25 |

Solution is facilitated by predilution of the amphoterics with water. The solubilities of various preparations in aqueous electrolyte solutions are set forth in Table I and Table II.

TABLE I.—PROPERTIES OF VARNEY AMPHOTERICS

| Structure | Soya<br>$|$<br>N<br>$/$ \\<br>$CH_2$  $CH_2$<br>$|$    $|$<br>$CH_2$  $CH_2$<br>$|$    $|$<br>O    O<br>$|$    $|$<br>H    $CH_2$<br>    $|$<br>    $CH_2$<br>    $|$<br>    $CH_2$<br>    $|$<br>    $SO_3H$ | Soya<br>$|$<br>N<br>$/$ \\<br>$CH_2$  $CH_2$<br>$|$    $|$<br>$CH_2$  $CH_2$<br>$|$    $|$<br>O    O<br>$|$    $|$<br>H    $CH_2$<br>    $|$<br>    $CH_2$<br>    $|$<br>    $CH_2$<br>    $|$<br>    $SO_2-OK$ | Coco<br>$|$<br>N<br>$/$ \\<br>$CH_2$  $CH_2$<br>$|$    $|$<br>$CH_2$  $CH_2$<br>$|$    $|$<br>O    O<br>$|$    $|$<br>H    $CH_2$<br>    $|$<br>    $CH_2$<br>    $|$<br>    $CH_2$<br>    $|$<br>    $SO_2-OK$ |
|---|---|---|---|
| Solubility properties: | | | |
| Water | Insoluble | Soluble | Soluble. |
| 20% KOH | Soluble | do | Do. |
| 40% KOH | Sol. (w. heating) | do | Do. |
| 20% NaOH | Soluble | do | Do. |
| 40% NaOH | Sol. (w. heating) | do | Insoluble. |
| 10% $H_2SO_4$ | Soluble | do | Soluble. |
| Conc. $H_2SO_4$ | do | do | Do. |
| 15% TKPP | Insoluble | do | Do. |
| 40% sodium meta silicate | do | do | |
| Alkylaryl sulfonate | Soluble | do | Soluble. |
| Quaternary ammonium | do | do | Do. |

TABLE II.—COMPARISON OF PROPANE SULTONE ADDUCTS WITH DIFFERENT ETHOXYLATED AMINES

| Amine compounds | Soya amine 2 E.O. adduct | Soya amine 5 E.O. adduct | Soya amine 9 E.O. adduct | Coca amine 2 P.O. adduct |
|---|---|---|---|---|
| Solubility properties: | | | | |
| Water | Yes | Yes | Yes | Yes. |
| 20% KOH | Yes | Yes | Yes | No. |
| 20% NaOH | Yes | Yes | No | No. |
| 40% KOH | Yes | No | No | No. |
| 40% NaOH | Yes | No | No | No. |
| 30% TKPP | No | Yes | | No. |
| Alkyl-aryl sulfonate | Yes | Yes | Yes | |
| Quaternary ammonium solution | Yes | Yes | Yes | |

The compounds of the invention are chemically stable to prolonged contact with alkaline systems as evidenced by measurement and evaluation of surface properties, e.g. wetting and foaming. For example, a solution of potassium N-coco N-ethanol amino-3-ethoxy propane sulfonate containing 30% sodium hydroxide and stored at 60° C. for two weeks suffered no discernible loss in wetting power.

Still another highly useful property of certain of the products of the invention is their ability to increase appreciably the viscosity of aqueous solutions. The unpredictability and unexpectedness of this utility is brought out by the discovered fact that while potassium N-coco N-ethanol amino-3-ethoxy propane sulfonate does not form viscous solutions, solutions of potassium N-tallow N-ethanol amino-3-ethoxy propane sulfonate, of corresponding concentrations, greatly affect solution viscosity. The contrast is shown by the data recorded in Tables III and IV.

TABLE III

| | Viscosity (cp.) | |
|---|---|---|
| Concentration (Percent "as is") | Potassium N-coco N-ethanol amino-3-ethoxy propanesulfonate | Potassium N-tallow N-ethanol amino-3-ethoxy propanesulfonate |
| 100 | 175 | 100 |
| 80 | 50 | 100 |
| 50 | 25 | 150 |
| 40 | 20 | 200 |
| 30 | 20 | 500 |
| 25 | 15 | 1000 |
| 20 | 10 | 1300 |
| 15 | 10 | 1200 |
| 10 | 10 | 500 |
| 5 | 5 | 150 |

The special capability of the tallow derivative to "thicken" water at rather low concentrations is a highly unusual property shared with only a few other classes of surface-active agents, the most notable of which are the alkanolamides. The viscosity effects achieved are found also in blends of the tallow derivative with other surfactants. Thus, while the coco derived amphoteric has no thickening action in solutions of sodium lauryl sulfate (SLS), potassium N-tallow N-ethanol amino-3- ethoxy propane sulfonate is highly effective, as shown in Table IV below.

TABLE IV

| Percent active in solution blend | | |
|---|---|---|
| S.L.S. | Potassium N-tallow N-ethanol amino-3-ethoxy propanesulfonate | Viscosity (cp.) |
| 15 | 0 | 20 |
| 12 | 3 | 40 |
| 10 | 5 | 300 |
| 9 | 6 | 3,000 |
| 8 | 7 | Gel |
| 6 | 9 | 7,000 |
| 5 | 10 | 1,500 |

The ability of the tallow-derived amphoteric products of the invention to exert a marked thickening effect on lauryl sulfate solutions has important industrial ramifications, particularly in the cosmetic field.

The results of foaming tests conducted by shaking 25 ml. of 0.5% active solutions in 100 ml. graduates are shown in Table V.

TABLE V

Product: Foam vol. (ml.)
    Sodium lauryl sulfate (SLS) _____ 60
    Coco amphoteric _____ 50
    Tallow amphoteric _____ 25

As expected, the tallow derivative foamed the least. Shake tests carried out on blends with lauryl sulfate established that mixtures containing approximately 2 parts SLS to one part tallow amphoteric foamed practically as well as did the lauryl sulfate alone, and also lathered profusely in shampoo tests. Blends of the coco amphoteric and lauryl sulfate exhibited the foaming properties of lauryl sulfate but produced a foam of a more creamy and more dense texture.

In evaluating the wetting properties of the amphoterics of the invention, Draves cotton skein sinking tests were conducted to determine the concentration of active ingredient required to give a 25 second sinking time. The results obtained are shown below in Table VI, lower values indicating more effective wetting.

TABLE VI

| Product: | Concentration, percent |
|---|---|
| Coco amphoteric | 0.10 |
| Tallow amphoteric | 0.16 |

In order further to evaluate the various properties and proficiencies of the amphoterics of the invention, detergency tests were carried out, recognizing that these are at best only semi-quantitative and serve merely as a basis for establishing comparisons with other compositions. Soiled wiping cloths were washed in 0.1% active solutions of sulfopropylated amphoterics. An aqueous 0.1% sodium dodecyl benzene sulfonate solution was used as a control. It was found that the amphoterics were as effective as the control in cleaning ability. Addition to alkaline builders enhanced detergency in all cases.

Eye irritation tests were conducted since it was believed that because of their amino acid structure the sulfopropylated amphoterics might be injurious to eye tissues and be unsuitable for use in shampoos. Surprisingly, as indicated in Table VII, tests on rabbits' eyes showed absence of irritation.

TABLE VII

| | Cornea | | | | Iris | | | | Conjunctivea | | | |
|---|---|---|---|---|---|---|---|---|---|---|---|---|
| Days | 1 | 2 | 3 | 4 | 7 | 1 | 2 | 3 | 4 | 7 | 1 | 2 | 3 | 4 | 7 |
| Potassium N-tallow N-ethanol amino-3-ethoxy propanesulfonate | 0 | 0 | 0 | 0 | 0 | 0 | 0 | 0 | 0 | 0 | 4 | 2 | 0 | 0 | 0 |
| Potassium N-coco N-ethanol amino-3-ethoxy propanesulfonate | 0 | 0 | 0 | 0 | 0 | 0 | 0 | 0 | 0 | 0 | 4 | 2 | 0 | 0 | 0 |

Human subjects were used in evaulating eye sting. When dilute (1%) solutions of the sulfopropylated amphoterics were introduced into the eyes of the subjects, it was found that the amphoterics, and that the tallow-derived product in particular, produced very little sting. Moreover, when blended with sodium lauryl sulfate solution, the tallow-derived amphoteric was effective to inhibit the normal sting of the lauryl sulfate.

The invention is further described with reference to the following illustrative examples, which, although indicative of typical representative compositions and processes for manufacture of the same, are nevertheless not intended to limit the generally broad scope of the invention in strict accordance therewith. The nature of the invention will be best understood by setting forth the detailed procedure for preparing a typical member of the sulfopropylated amphoterics. In the following and in the other illustrations of compositions falling within the scope of the invention, all parts listed are by weight, unless otherwise indicated.

EXAMPLE 1.—PREPARATION OF N-SOYA N-ETHANOLAMINE-3-ETHOXY PROPANE SULFONATE

| | Moles | Wt. (g.) | Wt. percent |
|---|---|---|---|
| Soya amine-2 mole ethylene oxide adduct | 1.50 | 540 | 35.1 |
| Propane sultone | 1.55 | 189 | 12.3 |
| Isopropanol | | 73 | 4.7 |
| Methanol | | 300 | 19.5 |
| Hydrogen peroxide (50%) | | 20 | 1.3 |
| Water | | 376 | 24.4 |
| Potassium hydroxide | | 40 | 2.6 |

540 g. of a 2 mole ethylene oxide adduct of soya amine and 189 g. of propane sultone was introduced into a 2-liter, 3-neck flask equipped with a mechanical stirrer and a thermometer. The mixture was stirred and heated slowly over a period of 3 hours to 50° C., at which time the temperature external heating was stopped. The reaction continued exothermically and during the next hour the temperature rose to 60° C. The isopropanol (73 g.) was then added slowly, and as the temperature continued to rise, samples were withdrawn and their solubility in dilute potassium hydroxide determined. When a sample gave a crystal clear solution, the reaction mixture was immediately diluted with 250 cc. of methanol. This addition of methanol was effected rapidly to prevent too extensive thickening. The homogenous solution was bleached by treating with 20 g. of 50% hydrogen peroxide and heating to reflux with stirring for 45 minutes. Adjustment with methanol gave the "acid" product showing a Gardner 5 color at 50% solids.

EXAMPLE 2

The salt form of the above compound was prepared by adding a solution of 40 grams of potassium hydroxide dissolved in 376 cc. of distilled water to provide a final solution having a Gardner 6+ color.

EXAMPLE 3

Preparation of Soya Derived Amphoteric, Cut Back with Ethanol

A sulfopropylated amphoteric was prepared in accordance with the procedure given in Example 1, but using denatured ethanol instead of methanol as a solvent, to provide a product finding special utility in cosmetic formulations.

EXAMPLE 4

A sulfopropylated amphoteric prepared in accordance with the procedure of Example 1, but omitting the isopropanol diluent, was dissolved in methanol only with considerable difficulty.

EXAMPLE 5

Preparation of Soya Amine-2 Mole Ethylene Oxide-2 Mole Propane Sultone Adduct in Dichlorethylene Solvent A mixture of 180 g. (0.5 m.) soya amine-2 mole ethylene oxide and 122 g. (1.0 m.) propane sultone was slowly heated to 100° C. in 100 cc. of dichlorethane, with stirring. Upon completion of the reaction, the solvent was removed from the product by vacuum stripping.

EXAMPLE 6

A formulation similar to that described in Example 5 was prepared but using benzene as the solvent.

EXAMPLE 7

Preparation of Soya Amine-9 Mole Ethylene Oxide Adduct-Propane Sultone Adduct 175 g. (0.25 m.) a soya amine-9 mole ethylene oxide adduct, 100 cc. dichloroethane, and 30.5 g. (0.25 m.) propane sultone were combined in a 500 cc. flask and heated to reflux. The resulting product, stripped of solvent, was soluble in water.

EXAMPLE 8

Preparation of Coco Amine-2 Mole Propylene Oxide Adduct-Propane Sultone Amphoteric 157.5 g. (0.5 m.) coco amine-2 mole propylene oxide adduct, 100 cc. of dichlorethane, and 61 g. (0.5 m.) of propane sultone were combined in a 500 cc. flask fitted with a reflex condenser and a stirrer. The mixture was stirred and refluxed for 2 hours and the solvent then removed under reduced pressure. The final product, insoluble in 20% NaOH and in 20% KOH, was similar to the soya-derived product of Example 5.

EXAMPLE 9

Preparation of Soya Amine-5 Mole Ethylene oxide Adduct-Propane Sultone Amphoteric 117.7 g. (0.25 m.) soya amine-5 mole ethyle oxide adduct, 100 cc. of dichlorothane, and 30.5 g. (0.25 mole) of propane sultone were stirred and heated under reflux for 2 hours. The resulting product was stripped and water and alcohol added to provide a solids concentration of 59.5%. The resulting product was soluble in 20% KOH, 20% NaOH, 30% TKPP, alkyl-aryl sulfonate solution, and quaternary ammonium solution, but insoluble in 40% KOH.

EXAMPLE 10

Preparation of Ethoxylated $C_8$-Amine-Propane Sultone Amphoteric 108.5 g. (0.5 m.) ethoxylated $C_8$-amine, $$C_8H_{17}N=(CH_2CH_2OH)_2$$

and 62 g. (0.524 m.) propane sultone were charged into a 500 cc. flask and heated slowly to 75°–80° C., with stirring, and 22 cc. of isopropanol then added to the mixture. When a test aliquot was found to be completely soluble in dilute potassium hydroxide, the reaction mixture was further reduced with 100 cc. of methanol to make a 60% solids finished product.

In concentrations of less than 1%, this amphoteric was soluble in 50% aqueous caustic. The product was also soluble in certain liquid fertilizer and weed killer formulations, and serves as an excellent coupling agent for other surface active agents in these materials.

EXAMPLE 11

Preparation of Coco Amine-2 Mole Ethylene Oxide Adduct—Propane Sultone Amphoteric 197.5 g. (0.63 m.) of coco amine-2 mole ethylene oxide adduct and 78.8 g. (0.6 m.) propane sultone were charged into a 1 l. flask and the mixture stirred and slowly heated to 70° C. at which temperature 25 cc. of isopropanol was added. When a tested sample of the product was found to be completely soluble in dilute potassium hydroxide, the reaction mixture was diluted with 300 cc. of denatured ethanol.

EXAMPLE 12

A 210 g. portion of the product of Example 11 was converted to the salt form by addition of 5 g. of potassium hydroxide dissolved in 50 cc. of distilled water. This product showed good lathering characteristics and is particularly suited for use in shampoo formulations.

EXAMPLE 13

Preparation of Coco Amine-2 Mole Ethylene Oxide Adduct-Propane Sultone Adduct With Water as Product Solvent This product was prepared in accordance with the procedure for Example 12 except that instead of the denatured alcohol a solution of 350 cc. distilled water and 10 g. of potassium hydroxide pellets was added. This product, exhibiting good lathering characteristics, may be stripped of isopropanol if desired.

EXAMPLE 14

Preparation N-Coco N-Ethanol Amino-3-Ethoxy-Propane Sulfonate

| Ingredients: | Parts by weight |
| --- | --- |
| N-coco N,N-diethanol amine (coco amine-2 mole ethylene oxide adduct) | 33.6 |
| Propane sultone | 14.7 |
| Dipropylene glycol | 18.5 |
| Water (softened or distilled) | 31.9 |
| Potassium hydroxide | 1.3 |

Procedure.—A reactor was charged with the amine and the propane sultone and the mixture heated to 60° C. with agitation. The reaction mixture become exothermic and the temperature rose to 149° C. After 15 to 30 minutes reaction was complete as indicated by the formation of a crystal clear solution upon dissolving a few drops of the product in distilled water.

Dipropylene glycol was added and the mixture cooled to 82° C. to 93° C. and water added. Upon adjustment of the pH to 7-8 with potassium hydroxide, a 0.4% concentration of the product in aqueous solution showed a wetting time of 25 seconds in the Draves cotton skein sinking test. With a highly refined starting amine having a Gardner 1 color, a clear Gardner 1 liquid product was obtained.

EXAMPLE 15

Preparation of N-Tallow N-Ethanol Amino-3-Ethoxy Propane Sulfonate 67.0 g. (0.55 m.) propane sultone was added to 193.5 g. (0.5 m.) tallow amine and the mixture stirred and heated to 78° C. At about 90° C., 80 cc. of isopropyl alcohol was added. A part of the reaction product was kept in the acid form.

20 cc. of distilled water and 2 g. of potassium hydroxide pellets were added to 80 g. of the product, the latter exhibiting good foaming and good solution thickening power.

While this invention has been described in conjunction with the present preferred embodiments and procedures, it is evident that the invention is not limited thereto. Further modifications of the method and products disclosed herein which fall within the scope of the following claims will be immediately evident to those skilled in this art. To the extent that these changes and modifications are within the scope of the appended claims, they are to be considered a part of this invention.

What is claimed is:

1. A sulfoalkylated amphoteric compound, including an anion represented by the following formula:

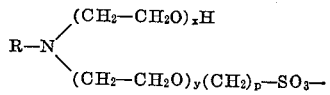

in which R is selected from the group consisting of alkyl groups of from 6 to 20 carbon atoms and mixtures thereof, $p$ is a positive integer of from 3 through 4, and in which $x$ and $y$ are positive integers of from 1 through 7, and a cation selected from the group consisting of alkaline earth metal ions yielding water-soluble products, alkali metal ions, ammonium ion, and hydrogen ion.

2. An amphoteric compound as defined in claim 1 further characterized in that R is an aliphatic chain of from 8 to 18 carbon atoms.

3. An amphoteric compound as defined in claim 1 in which $x$ equals 1.

4. An amphoteric compound as defined in claim 1 in which $y$ equals 1.

5. An amphoteric compound as defined in claim 1 wherein $x$ is 1 and $y$ is 1.

6. An amphoteric compound as defined in claim 1 whereas R is a nalkyl group containing 8 to 18 carbon atoms, and wherein $x$ is 1 and $y$ is 1.

7. An amphoteric compound as defined in claim 1 wherein $x$ is 1, $y$ is 1, and $p$ is 3.

8. An amphoteric compound as defined in claim 7 wherein $p$ is 3.

9. In a process for making a sulfoalkylated amphoteric compound having the general formula

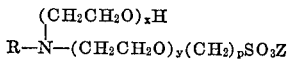

in which x and y are positive integers of from 1 through 7, and in which z is a cation selected from the group consisting of alkaline earth metal ions yielding water-soluble products, alkali metal ions, ammonium ion, and hydrogen ion, the steps comprising
(A) mixing the following reactants in substantially equal molar ratios
(1) an ethoxylated amine of the structure $$R-N=[CH_2-CH_2-O)_nH]_2$$

in which R is selected from the group consisting of alkyl groups of from 6 to 20 carbon atoms and mixtures thereof, and $n$ is a positive integer of from 1 through 7, with
(2) a sultone reagent of the structure

where $p$ is a positive integer of from 3 through 4,
(B) effecting reaction between components (1) and (2) through the steps of agitating and heating the mixture, and
(C) recovering the sulfoalkylated amphoteric compound.

References Cited
UNITED STATES PATENTS 3,198,822  8/1965  Mannheimer.

DANIEL D. HORWITZ, Primary Examiner

U.S. Cl. X.R.

252—161, 121, 138, 152; 424—303; 71—103